Patented June 11, 1946

2,402,106

UNITED STATES PATENT OFFICE 2,402,106

STABLE DIAZONIUM SALTS

William Henry von Glahn, Loudonville, and William Leo Walsh, East Greenbush, N. Y., assignors to General Aniline & Film Corporation, New York, N. Y., a corporation of Delaware No Drawing. Application September 9, 1942, Serial No. 457,716

4 Claims. (Cl. 8—44)

The present invention relates to the stabilization of dye solutions or printing pastes from diazonium salts.

It is known that printing pastes or dye solutions made up from diazonium salts have a tendency to decompose, with a resulting considerable loss in color, strength and brightness. We have now found that this tendency of such compounds to decompose may be satisfactorily overcome by adding to such compounds a readily soluble heterocyclic sulfonic acid or a soluble salt thereof, and the stabilization of such compounds and the resulting compositions constitute the purposes and objects of the present invention.

Our experiments have demonstrated that any heterocyclic sulfonic acid or a soluble salt thereof which does not couple or form a diazo amino compound with the diazonium salt, may be utilized for the stabilization procedure. Thus we may use heterocyclic sulfonic acids of cyclic compounds containing one or more hetero atoms in the ring, said compounds containing one or more sulfonic acid groups. For instance, the sulfonic acids may be sulfo-acids of quinaldines, pyridines, thiophens, furanes, cumarines, pyrazoles and the like. The diazonium salts to which the heterocyclic sulfonic acids or their water-soluble salts are added are stable diazonium chlorides, carbonates and sulfates, diazonium sulfonates, and salts of diazonium compounds with acids and acid-reacting metal compounds, such as diazonium salts of fluoroboric acid, of fluorosulfonic acid; and of heavy metal chlorides such as zinc chloride, cobalt chloride, tin chloride and the like. The aryl radical containing the azo group may be unsubstituted, such as phenyl, diphenyl or the like; or may be substituted by chlorine atoms, nitro groups, acyl-amino groups, for example acetylamino and the like; water-solubilizing groups, for example carboxy-, sulfo- and hydroxyl groups; ether groups such as methoxy-, ethoxy- and the like.

The heterocyclic sulfonic acids or the water-soluble salts thereof may be added to the dry diazonium salts, to wet presscakes thereof, or to the dye solutions or printing pastes containing the diazonium compounds.

It has been found that satisfactory results ensue irrespective of when the addition is made. The amount of the stabilizer necessary to effect stabilization will depend on the molecular weight of the particular diazonium compound with which the stabilizer is incorporated. It may be said, in general, however, that the minimum amount of the stabilizer is equi-molecular to the amount of the diazonium compound. Usually, however, it is advisable to apply an excess of the stabilizer in order to insure best results.

Our invention is illustrated by the following examples, in which the parts are given by weight, but it is to be understood that the examples are illustrative and not limitative.

*Example 1.*—100 parts of the diazonium salt compound made by drying with $Al_2(SO_4)_3 6H_2O$ the moist presscake of diazonium-2.5-di-chloraniline-zinc chloride double salt and containing 20 parts of the double salt are intimately mixed with 15 parts of pyridine beta sulfonic acid—prepared according to German Patent 541,036. A diazonium salt preparation of excellent stability in dyeing and printing operations is obtained.

*Example 2.*—100 parts of a dry mixture containing sodium sulfate and 20 parts of the zinc chloride double salt of diazonium-4-chlor-2-nitraniline are mixed with 15 parts of the sodium salt of thiophen-alpha-sulfonic acid. A diazonium salt is obtained which gives a printing paste of very good stability.

*Example 3.*—The moist presscake of the zinc chloride double salt of tetrazo dianisidine is mixed with about 8% of the mono sodium salt of the quinoline disulfonic acid described in German Patent 29,920. After addition of sodium sulfate the mixture is dried at 40° C. to a powder. The printing paste from this product has a stability far superior to a like printing paste made without the above disulfonic acid.

*Example 4.*—100 parts of a dry powder containing 20 parts of the double salt of diazonium-4 nitro-2-anisidine with zinc chloride are mixed with 16 parts of the disodium salt of furane-2-carboxy-5-sulfonic acid. This addition yields a diazonium salt which is much more stable than the diazonium salt without the above addition.

*Example 5.*—If, in Example 3, the quinoline disulfonic acid is replaced by either cumarine-6-sulfonic acid or by cumarine-3.6-disulfonic acid or their sodium salts, diazonium salts are obtained which produce printing pastes of excellent stability.

*Example 6.*—100 parts of a dry powder containing 20% of the diazonium sulfate of paranitraniline and 80% of sodium sulfate are mixed intimately with 10 parts of 1-phenyl-3-methyl pyrazol-5-sulfonic acid sodium salt. A diazonium salt of excellent stability is produced.

*Example 7.*—A moist presscake of a diazonium borfluoride of meta-chloraniline is mixed with about 5% of pyridine-beta-sulfonic acid and the mixture dried by incorporation of $$Al_2(SO_4)_3 6H_2O$$

The diazonium salt preparation which results is of vastly improved stability.

*Example 8.*—100 parts of a dry mixture containing 16 parts of the cobalt chloride double salt of 4-chlor-2-amido diphenyl ether-diazo is mixed with 15 parts of the disodium salt of furane - 2 - carboxy-5-sulfonic acid. Printing pastes from this mixture are of excellent stability.

We claim:

1. A stable mixture comprising a diazonium salt preparation and as such a heterocyclic compound selected from the class consisting of the sulfonic acid of quinaldines, pyridines, thiophens, furanes, cumarines, pyrazoles and the water-soluble salts of said sulfonic acids.

2. Diazonium - 2.5 - dichloraniline-zinc chloride double salt stabilized with pyridine-beta-sulfonic acid.

3. The zinc chloride double salt of diazonium-4-chlor-2-nitraniline stabilized by the sodium salt of thiopen-alpha-sulfonic acid.

4. The zinc chloride double salt of tetrazo dianisidine stabilized with the sodium salt of quinoline disulfonic acid.

WILLIAM HENRY von GLAHN.
WILLIAM LEO WALSH.